United States Patent
Carragher

(10) Patent No.: US 11,428,067 B2
(45) Date of Patent: Aug. 30, 2022

(54) HEAT SOURCES AND ALLOYS FOR USE IN DOWN-HOLE APPLICATIONS

(71) Applicant: BiSN Tec LTD, Warrington (GB)

(72) Inventor: Paul Carragher, Lymm (GB)

(73) Assignee: BiSN Tec Ltd., Birchwood (GB)

(*) Notice: Subject to any disclaimer, the term of this patent is extended or adjusted under 35 U.S.C. 154(b) by 0 days.

(21) Appl. No.: 17/195,546

(22) Filed: Mar. 8, 2021

(65) Prior Publication Data

US 2022/0018211 A1  Jan. 20, 2022

Related U.S. Application Data

(63) Continuation of application No. 16/104,923, filed on Aug. 19, 2018, now Pat. No. 10,941,630, which is a continuation of application No. 15/374,336, filed on Dec. 9, 2016, now Pat. No. 10,053,950, which is a continuation of application No. 14/654,414, filed as
(Continued)

(30) Foreign Application Priority Data

Dec. 20, 2012 (GB) ..................................... 1223055

(51) Int. Cl.

| | | |
|---|---|---|
| E21B 33/13 | (2006.01) | |
| E21B 33/12 | (2006.01) | |
| C22C 12/00 | (2006.01) | |
| E21B 27/02 | (2006.01) | |
| E21B 33/134 | (2006.01) | |
| E21B 36/00 | (2006.01) | |
| E21B 33/136 | (2006.01) | |
| E21B 17/10 | (2006.01) | |
| C06B 33/00 | (2006.01) | |
| C06B 47/00 | (2006.01) | |
| C09K 8/42 | (2006.01) | |
| C22C 9/00 | (2006.01) | |
| E21B 47/00 | (2012.01) | |

(52) U.S. Cl.
CPC .............. *E21B 33/13* (2013.01); *C06B 33/00* (2013.01); *C06B 47/00* (2013.01); *C09K 8/426* (2013.01); *C22C 9/00* (2013.01); *C22C 12/00* (2013.01); *E21B 17/1028* (2013.01); *E21B 27/02* (2013.01); *E21B 33/12* (2013.01); *E21B 33/1204* (2013.01); *E21B 33/1208* (2013.01); *E21B 33/134* (2013.01); *E21B 33/136* (2013.01); *E21B 36/008* (2013.01); *E21B 47/00* (2013.01)

(58) Field of Classification Search
CPC ...... E21B 33/13; E21B 33/12; E21B 33/1208; E21B 36/008
See application file for complete search history.

(56) References Cited

U.S. PATENT DOCUMENTS

| | | | |
|---|---|---|---|
| 10,053,950 B2* | 8/2018 | Carragher | ........... E21B 17/1028 |
| 2006/0144591 A1* | 7/2006 | Gonzalez | ................ E21B 29/10 |
| | | | 166/57 |
| 2013/0192833 A1* | 8/2013 | Gano | ...................... E21B 36/00 |
| | | | 166/373 |

* cited by examiner

*Primary Examiner* — Catherine Loikith

(57) ABSTRACT

A chemical reaction heat source for use in heaters used in down-hole application. The heat source has a fuel composition that comprises thermite and a damping agent. The use of the thermite mix enables the heaters of the present invention to generate hotter temperature down wells. This in turn allows the use of Bismuth/Germanium alloys, which have higher melting points, to enable the production of plugs for the abandonment of deeper wells where subterranean temperatures are higher.

31 Claims, 3 Drawing Sheets

Related U.S. Application Data application No. PCT/GB2013/053396 on Dec. 20, 2013, now Pat. No. 10,145,203.

HEAT SOURCES AND ALLOYS FOR USE IN DOWN-HOLE APPLICATIONS

This application is a continuation of Ser. No. 16/104,923 filed Aug. 19, 2018, which is a continuation of Ser. No. 15/374,336 filed on Dec. 9, 2016, which is a continuation of Ser. No. 14/654,414, filed on Jun. 19, 2015, which claims priority under 35 USC 371 to International Application No. PCT/GB2013/053396, filed Dec. 20, 2013, which claims priority to GB 1223055.3 filed Dec. 20, 2012, the entire disclosure of each of which is incorporated herein by reference.

FIELD OF THE INVENTION

The present invention relates to the operations carried out underground down holes and other underground conduits such as wells, and in particular oil and gas wells. More particularly the present invention relates to chemical heat sources and alloys for use in down-hole applications such as the plugging of wells.

BACKGROUND OF THE INVENTION

When a well, such as an oil or gas well, is at the end of its useful life it is usually abandoned or for well suspension due to low oil prices, "workovers" or other event that require the well to be temporary suspended (i.e. approaching storms or hurricanes). However before a well can be abandoned the well must be "plugged" to ensure that potentially hazardous materials, such as hydrocarbons, cannot escape the well.

In the past various methods have been employed to plug abandoned wells. One such known method involves pouring cement or resin into a well so as to fill a length of the well. However the use of cement/resin has proven to be unreliable and vulnerable to leaking. This can lead to previously abandoned wells being re-plugged at considerable extra expense.

In view of the limitations of using cement/resin to plug wells an alternative approach was developed which uses a bismuth-containing alloy to form a seal within the well. This approach, which is described in detail in CA 2592556 and U.S. Pat. No. 6,923,263, makes use of the fact that such alloys contract upon melting and expand again when they re-solidify. Essentially the alloy is deployed into a well; heated until it melts and "slumps"; and then allowed to cool whereby the alloy expands to form a tight seal with the walls of the well.

The use of eutectic alloys, such as bismuth-containing alloys, to plug wells or repair existing plugs in wells is described in: U.S. Pat. Nos. 7,290,609; 7,152,657; US2006/0144591; U.S. Pat. Nos. 6,828,531; 6,664,522; 6,474,414; and US 2005/0109511.

International PCT application WO2011/151271 describes a number of improvements relating to methods and apparatus for use in well abandonment.

SUMMARY OF THE INVENTION

The present invention relates to improvements in the methods and apparatus used in, amongst other things, well abandonment. However it is appreciated that heaters of the present invention can be used in a wide range of other down-hole applications too without departing from the scope of the present invention.

The improvements relate to the Bismuth alloy plugs used to close off or 'plug' wells (and other underground conduits), and the heaters used in down-hole applications such as the deployment and retrieval of plugs from an underground conduits, such as a well casings.

A first aspect of the present invention relates to the discovery that by adopting chemical reaction heat sources, in the form of thermite, in Bismuth-based plug deployment/retrieval heaters it has been possible greatly increase the heating output of the heaters used in down-hole applications such as well abandonment and well plug retrieval.

However the heating capabilities also make the heaters of the present invention particularly suitable for other down-hole applications such as: squeezing off; the fitting and repair of annulus packers; and the maintenance and repair of sand filters.

In the past thermite has been used in welding railway lines, bomb disposal and decommissioning military equipment left on a battlefield. Thermite has not, however, been used in down-hole operations such as well plugging.

It is believed that this is because pure thermite (as used in the above mentioned applications) burns too hot to be used in the plug deployment and retrieval heaters. The present invention therefore provides heating mixtures using a combination of basic thermite (e.g. aluminium and iron oxide powder) and a combustion suppressing or damping agent such as silica (i.e. sand). Whilst sand is identified as a suitable damping agent it will be readily appreciated that alternative damping agents may be utilised.

The thermite and the damping agent (e.g. sand) act as a fuel composition for the chemical reaction heat source of the present invention.

It is has been discovered that adjusting the proportions of a damping agent (e.g. sand) to thermite in the fuel composition cools the standard thermite reaction down from 2,500° C. (0% damping agent in the form of sand) to around 600° C. (30% damping agent in the form of sand). This enables the composition used in the plug heaters to be mixed as appropriate to the type of Bismuth alloy being used.

It is envisaged that the type of fuel composition used can also depend on the size of the heater, which in turn is dictated by the size of the plug being deployed/retrieved.

The fuel composition of the present invention may be provided in either a powdered form or a block form. However, the fuel composition of the present invention is preferably in the form of one or more blocks.

The main benefit of the fuel composition being in a solid form rather than a powder form is that mixture of thermite and the damping agent remains homogenous (i.e. evenly mixed) throughout the lifetime of the chemical reaction heat source.

In particular this is important when heaters and their chemical reaction heat sources are transported from one location to another. It is appreciated that transportation of powder mixtures can result in the settlement of the thermite and sand, for example, into a non-homogenous mix. This can have a detrimental impact on the heating efficiency of the fuel composition, which may not become apparent until a heater is in-situ down a hole.

In addition to ensuring that the mixture remains homogenous, the formation of the fuel composition in to solid blocks enables more control over the heating patterns generated by the chemical reaction heat sources of the present invention. To this end it is envisaged that advantageously the ratio of thermite to damping agent may be varied from block to block as required.

It is envisaged that providing a range of fuel composition blocks will enable the blocks to be placed in different arrangements so as to achieve different heating patterns that suit the particular role that a heater is to perform.

For example, arranging the blocks with higher proportions of thermite at one end of the heat source will ensure that one end of the heat source generates more heat than the other end. This enables heat to be directed appropriately depending upon whether a heater is deploying a plug or retrieving a plug.

It is envisaged that compositions with a damping agent content of greater than 30% have a reduced likelihood of reacting and thus are not preferable in powder or single block arrangements.

However where multiple fuel composition blocks are employed in an arrangement it is appreciated that blocks with higher damping agent content might be advantageous in the formation of particular heating patterns.

When using smaller sized heaters (e.g. diameters of less than 4 and half 30 inches) it considered appropriate to use lower proportions of damping agent (e.g. sand) in the thermite mixture. However, when using larger heaters (e.g. diameters of more than 4 and half inches) it is considered more appropriate to use thermite mixtures with higher proportions of damping agent (e.g. sand).

In order to initiate the thermite chemical reaction an igniter is required. The igniter is completely safe to handle and ship. However, once the correct current/voltage is run through it, the igniter creates a very high ignition temperature that starts the thermic reaction described above.

The present invention provides a down well heater that comprises the fuel composition described above. As already mentioned, the down well heater of the present invention is particularly suitable for well plug delivery and retrieval but it is envisaged that the heater could also be effectively employed in a range of other down-hole applications without departing from the scope of the present invention.

In use, the igniter may be placed into a recess/hole formed in the fuel composition. However, in order to ensure that the reaction of the composition is initiated by the igniter a small amount of pure thermite is provided around the igniter. In this way the igniter will start the thermite (pure) reaction that in turn will start the thermic reaction of the fuel composition.

Preferably a region of pure damping agent, such as sand, may be located at the bottom of the fuel composition. This then serves as a heat shield, for example in situations where a regions of an associated plug needs to be kept cooler to enable melted alloy to cool and set.

The increased heating capabilities of the chemical reaction heat source of the present invention means that plugs using alloys with higher melting points can be deployed/retrieved. This improvement in heat generation has given rise to the second aspect of the present invention.

The second aspect of the present invention relates to the use of Germanium/Bismuth alloys to plug underground conduits and wells, and in particular oil and gas wells.

Germanium/Bismuth alloys have not typically been used in well abandonments due to their higher melting temperatures relative to other Bismuth containing alloys.

In the past the trend has been to use Bismuth alloys with lower melting points, such as Bismuth (58%) and Tin (42%) alloys, which melt at 138° C. Typically this has been necessitated by the limited heating ability of the heaters used to deploy Bismuth alloy plugs within wells.

It is noted that adding Germanium to pure Bismuth in a percentage of less that 1% by weight significantly increases the melting temperature of the Bismuth Germanium alloy. 99% bismuth and 1% germanium increases the melting temperature of the alloy to approx. 550° C., this compares with 271° C. for pure bismuth.

Increasing the percentage level of Germanium to 10% by weight increases the temperature to approx. 740° C. It is has been discovered that the maximum level of Germanium with a noticeable effect on the temperature is about 20% by weight and therefore this is the preferred maximum of Germanium content.

Preferably the alloys of the present invention may have further metals, such as copper, added to give further beneficial properties. Bismuth and Copper alloys have a melting point close to 271° C. but are more durable than pure Bismuth, which is very brittle.

The increased heater heating capabilities made possible by the thermite chemical reaction heaters of the present invention enable the use of Germanium/Bismuth alloys. The use of alloys with higher melting temperatures (e.g. Germanium/Bismuth alloys have a melting point of around 550° C.) has benefits for plugging wells that are in high temperature environments, such as wells that extend deeper into the earth.

BRIEF DESCRIPTION OF THE DRAWINGS

The present invention will now be described with reference to the drawings, wherein.

DESCRIPTION OF THE VARIOUS ASPECTS OF THE PRESENT INVENTION

It is envisaged that the various aspects of the present invention can be use alone or in combination with one another to provide real benefits in the plugging of underground conduits. It is envisaged that although the present invention is particularly applicable in plugging both vertical and non-vertical wells (with or without well casings) the heaters of the present invention have characteristics which make that suitable for a range of other down-hole applications.

For example the described aspects can be used together with the methods and apparatus described in WO2011/151271 to facilitated the squeezing off and repairing of wells.

Whilst the various aspects of the present invention are considered particularly applicable to the plugging of oil and gas wells it is envisaged that they would provide benefits when plugging other forms of underground conduits such as water pipes for example.

In a preferred embodiment of the chemical reaction heat source of the present invention the fuel composition is provided in the form of a stacked arrangement of blocks that, in use, are housed within a heater body. Each block is capable of generating a certain level of heat, the level of which is predetermined by the ratio of thermite to damping agent (e.g. sand) in the composition mix of that particular block.

It is envisioned that a range of predetermined mixes, which are capable of generating a range of predetermined temperatures, are produced by varying the levels of thermite from 99% to 1% by mixing the thermite with a damping agent. The damping agents (or combustion suppressing agents as it may also be referred to herein) preferably take the form of silica or sand. However it is envisioned that alternative forms of damping agent may also be adopted without departing from the general inventive concept of the present invention.

It is appreciated that by arranging blocks with differing heating abilities in specific stacking orders it is possible to create a chemical reaction heat source that generates a heating pattern appropriate to the type of heater it is being used in.

Figure 1:
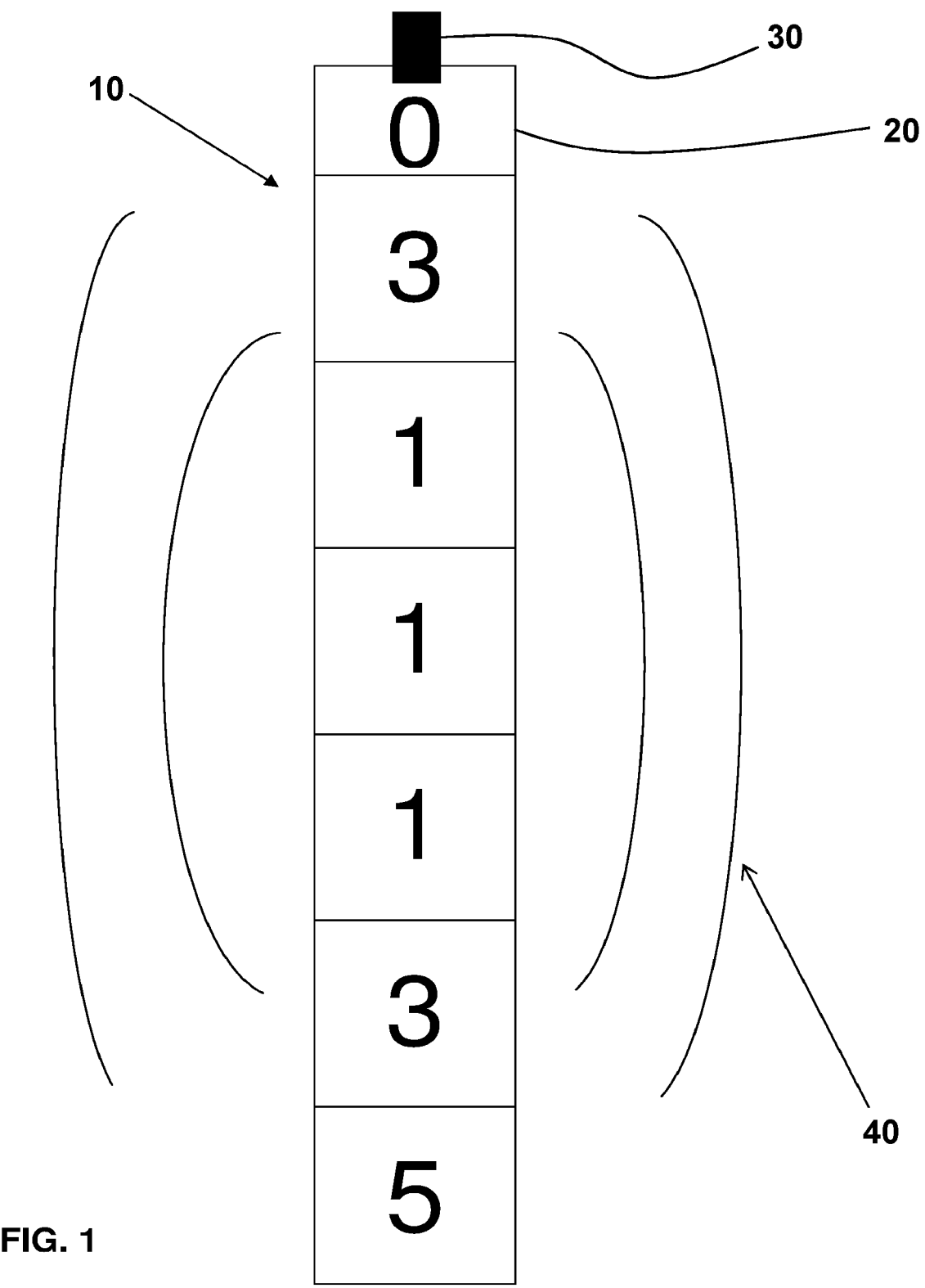
FIG. 1 shows an arrangement of heating blocks suitable for a plug deployment heater.
Figure 2:
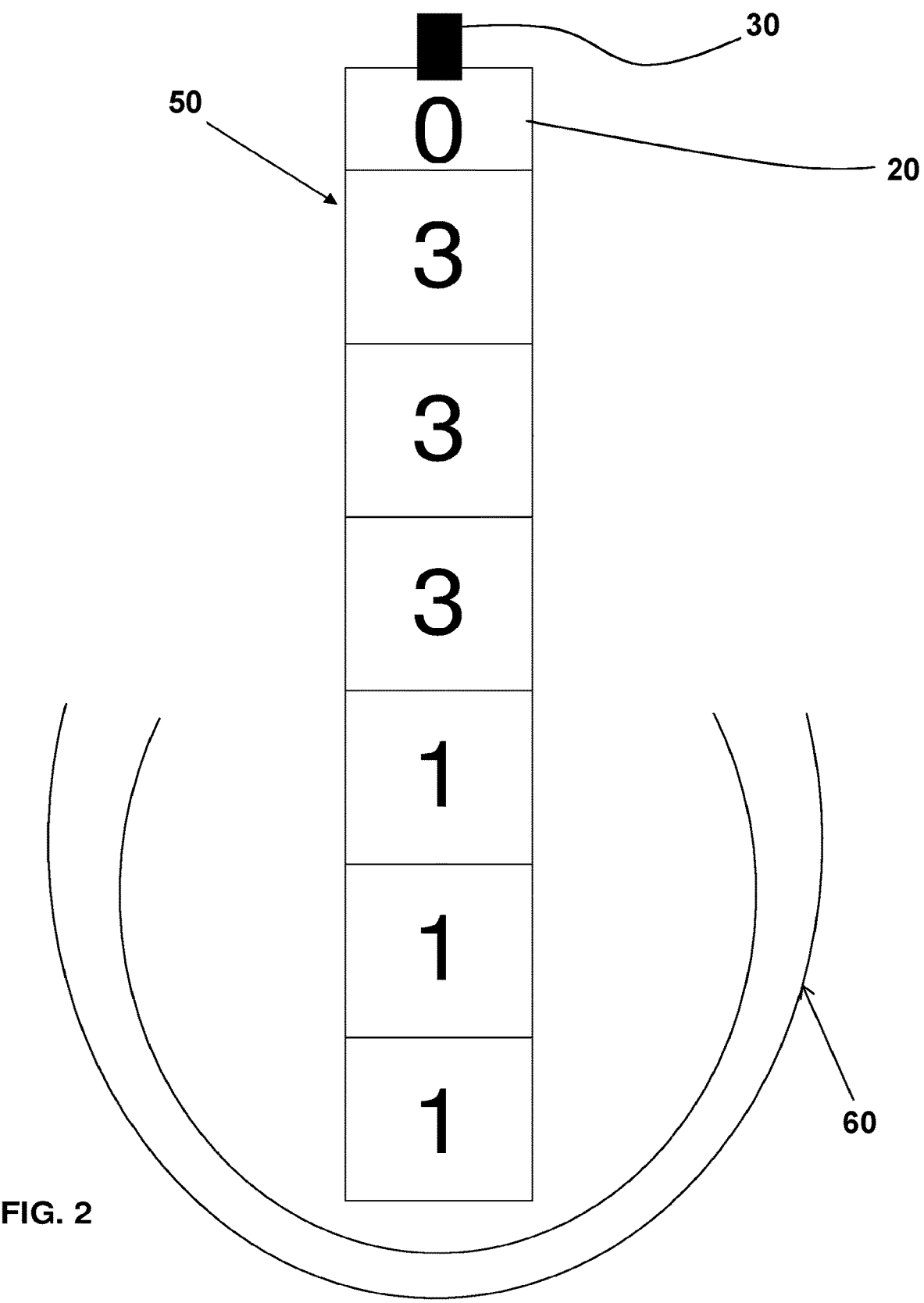
FIG. 2 shows an arrangement of heating blocks suitable for a plug retrieval heater.

FIGS. 1 and 2 each show an example of a chemical reaction heat source, 10 and 50, with a block stacking arrangement that creates a distinct heating pattern.

For the ease of understanding the heating power of each block has been assigned a number from 0 to 5, wherein 0 burns faster and therefore hotter and 5 burns slower and therefore cooler. Although the ratio of thermite to damper agent in each point of the scale is not specifically identified herein it is envisioned that the hottest level 0 may be provided by almost pure thermite. The coolest level (i.e. 5) may be provided by a mix predominately made from a damping agent (e.g. sand).

It will be appreciated that the ratios of the mixes used to achieve the heating powers of 1 to 4, for example, will therefore vary between the two end points set by the mixes of heating power 0 and heating power 5.

In both of the examples shown the region 20 nearest to the igniter 30 (shown as 0) has the highest level of thermite (virtually 100%) so as to ensure that the chemical reaction gets off to the best start. It is envisioned that, due to the potency of the pure thermite, the starter block may be smaller than the other blocks in the stack.

Although not shown it is also appreciated that pure thermite powder may be provided in and around the region where the igniter and the first block come into contact. In this way the chemical reaction is given the best chance of being successfully initiated.

FIG. 1 shows a diagram of an arrangement of fuel composition blocks 1 that provides a chemical reaction heat source that is particularly suited to a heater for deploying Bismuth-based plugs such as those described in WO2011/151271.

The arrangement shown in FIG. 1, which arranges the faster/hotter reacting blocks in the middle of the stack, is particularly suited to the task of deploying a Bismuth-based plug because the main focus of the heat in the heating pattern 40 is the middle of the heater, which, when the heater is engaged with a plug, is aligned to the location of un-melted alloy.

In addition, the provision of the coolest block at the base of the stack helps to direct the heat away from the base of the heater. This is important because this is the area where the melted alloy will start to cool down and expand against the sides of an underground conduit to form the required plug. Thus shielding this region from the heat source is advantageous.

Although not shown in the figures, it is envisaged that pure damping agent may be provided at the base of the heater stack shown in FIG. 1 to further shield the base region of the heater and the corresponding region of a plug.

FIG. 2 shows a diagram of an arrangement of fuel composition blocks 50 that provides a chemical reaction heat source that is particularly suited to a heater for retrieving Bismuth-based plugs such as those also described in WO2011/151271.

The arrangement 50 shown in FIG. 2, which arranges the faster and hotter reacting blocks (e.g. heating power 1) towards the bottom of the stack, is particularly suited to the task of retrieving a Bismuth-based plug that is in-situ within a well because the main focus of the heat 60 is towards the base of the heater, which, when the heater is engaged with a plug, is aligned the location of alloy plug.

It will be appreciated that the present invention allows the heating characteristics of a given heater to be fine-tuned to better suit the particular needs of any given down-hole task by effectively adjusting the arrangement blocks to achieve the most appropriate heating pattern.

In view of this the present invention also provides a method of tailoring a well abandonment system (i.e. a heater) to suit a particular underground conduit or well.

This method essentially comprises:
a) assessing the down-hole environmental characteristics of the underground conduit or well that is to be plugged;
b) selecting a Bismuth alloy suitable to produce a stable plug within the environment of the underground conduit or well;
c) providing a chemical reaction heat source suitable to melt the selected Bismuth alloy, said heat source having a fuel composition that comprises thermite and a damping agent;
d) producing a tailored well abandonment system comprising the selected Bismuth alloy and provided chemical reaction heat source.

It is appreciated that there are a range of down-hole environmental characteristics that may have a bearing on what type of heater and/or plug is required for the job. Some of the most relevant characteristics are:
1) Temperature in the region of the underground conduit where the plug is to be deployed;
2) Pressure in the region of the underground conduit where the plug is to be deployed;
3) Differential pressure requirement of the plug, now and in the future;
4) Well bore fluid;
5) Well completion characteristics.

It is envisioned that Bismuth/Germanium alloys may be adopted due to the enhanced heating capabilities realised by the thermite-based heat sources of the present invention.

Figure 3:
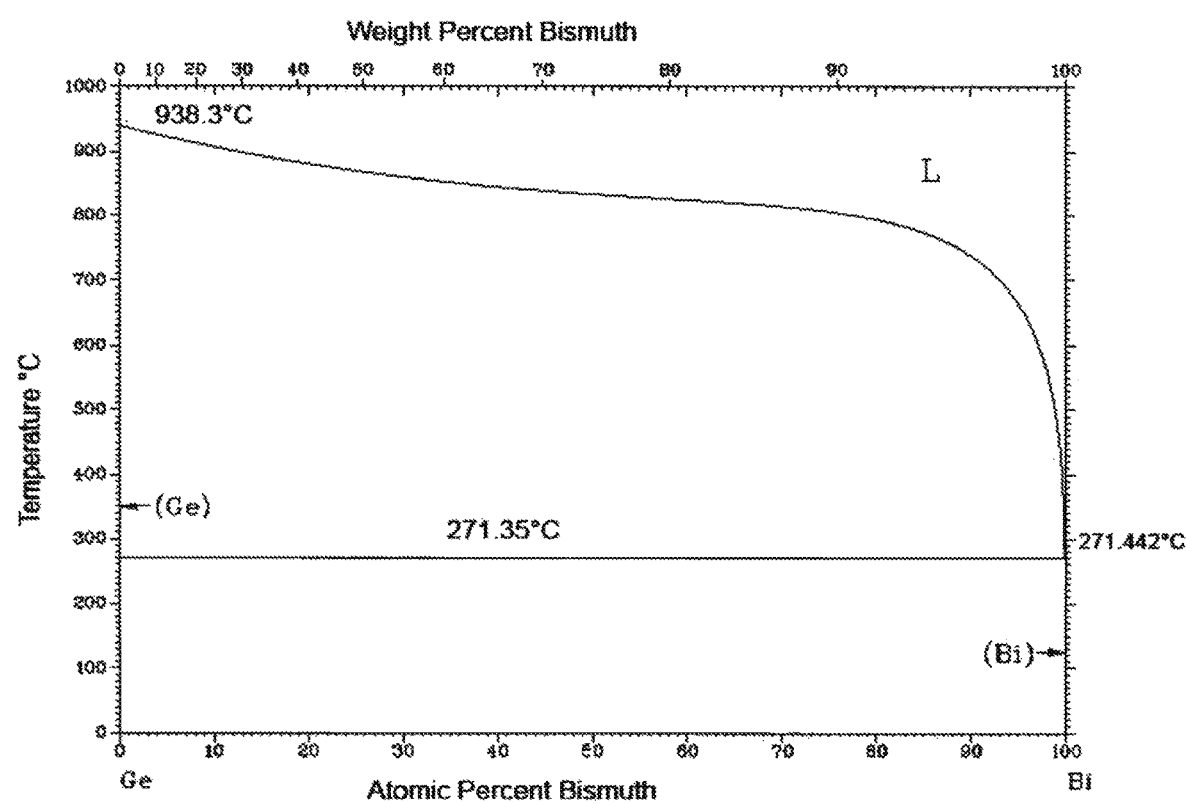
FIG. 3 shows a phase diagram for various mixes of Bismuth/Germanium alloys.

FIG. 3 shows how the melting temperature of an alloy can be controlled by varying the ratio of Bismuth to Germanium in the alloy. It will be appreciated from the data shown that the introduction of Germanium has a marked effect on the melting temperature up to about 20% by weight, after which the temperature increasing effects are less marked.

The present invention also provides for a method of tailoring a plug retrieval heater system that involves assessing the nature of the alloy of the plug that is to be retrieved from the underground conduit and then providing a chemical reaction heat source suitable to melt the alloy, said heat source having a fuel composition that comprises thermite and a damping agent.

The invention claimed is:
1. A downhole tool comprising:
(a) a heating element comprising a mixture of: (i) a chemical reaction heat source; and (ii) a damping agent; wherein the mixture defines a ratio of the chemical reaction heat source and the damping agent, wherein the ratio is selected to provide a predetermined temperature upon activation of the heating element; and,
(b) a plug material comprising an alloy, the alloy having a predetermined melting temperature;
(c) wherein the predetermined temperature is based upon the predetermined melting temperature, wherein the predetermined melting temperature is based upon the predetermined temperature, or both.

2. The downhole tool of claim 1, wherein the alloy comprises bismuth.

3. The downhole tool of claim 2, wherein the alloy comprises no more than 20% germanium by weight.

4. The downhole tool of claim 2, wherein the alloy comprises no more than 1% germanium by weight.

5. The downhole tool of claim 2, wherein the alloy comprises copper.

6. The downhole tool of claim 2, wherein the chemical reaction heat source comprises thermite.

7. The downhole tool of claim 2, wherein the dampening agent comprises sand.

8. The downhole tool of claim 2, wherein the predetermined temperature upon activation is 600° C.

9. The downhole tool of claim 2, wherein the predetermined melting temperature is from about 271° C. to about 938° C.

10. The downhole tool of claim 1, wherein the alloy comprises germanium.

11. The downhole tool of claim 10, wherein the alloy comprises copper.

12. The downhole tool of claim 10 wherein the chemical reaction heat source comprises thermite.

13. The downhole tool of claim 10 wherein the dampening agent comprises sand.

14. The downhole tool of claim 10 wherein the predetermined temperature upon activation is 600° C.

15. The downhole tool of claim 10 wherein the predetermined melting temperature is from about 271° C. to about 938° C.

16. The downhole tool of claim 1, wherein the alloy comprises germanium and bismuth.

17. The downhole tool of claim 1, wherein the mixture is homogenous.

18. The downhole tool of claim 17, wherein the mixture is a solid.

19. The downhole tool of claim 1, wherein the alloy comprises no more than 20% germanium by weight.

20. The downhole tool of claim 1, wherein the alloy comprises no more than about 1% germanium by weight.

21. The downhole tool of claim 1, wherein the alloy comprises copper.

22. The downhole tool of claim 1, wherein the chemical reaction heat source comprises thermite.

23. The downhole tool of claim 1, wherein the dampening agent comprises sand.

24. The downhole tool of claim 1, wherein the predetermined temperature upon activation is 600° C.

25. The downhole tool of claim 1, wherein the predetermined melting temperature is from about 271° C. to about 938° C.

26. A downhole tool system comprising:
    (a) a heating element comprising a mixture of: (i) a chemical reaction heat source; and (ii) a damping agent; wherein the mixture defines a ratio of the chemical reaction heat source and the damping agent, wherein the ratio is selected to provide a predetermined temperature upon activation of the heating element; and,
    (b) a plug material in a well, the plug material comprising an alloy, the alloy having a predetermined melting temperature; and,
    (c) wherein the predetermined temperature is based upon the predetermined melting temperature, wherein the predetermined melting temperature is based upon the predetermined temperature, or both.

27. The downhole tool system of claim 26, wherein the mixture is homogenous.

28. The downhole tool system of claim 27, wherein the mixture is a solid.

29. The downhole tool system of claim 26, wherein the mixture is a solid.

30. A method of using the downhole tool of claim 1 for a downhole application in a well.

31. The method of claim 30, wherein the downhole application comprises:
    an application selected from the group consisting of squeezing off, fitting of annulus packers, repairing of annulus packers, maintenance of sand filters, and repairing of said filters.

* * * * *